US006481514B2

(12) United States Patent
Takada

(10) Patent No.: US 6,481,514 B2
(45) Date of Patent: Nov. 19, 2002

(54) AUXILIARY POWER DEVICE OF WHEELCHAIR

(75) Inventor: Yoshihiro Takada, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/805,714

(22) Filed: Mar. 13, 2001

(65) Prior Publication Data

US 2001/0022244 A1 Sep. 20, 2001

(30) Foreign Application Priority Data

Mar. 15, 2000 (JP) ....................................... 2000-071773
Mar. 9, 2001 (JP) ....................................... 2001-067493

(51) Int. Cl.7 .......................... B62B 13/18; B62B 13/00

(52) U.S. Cl. ............................ 180/11; 180/15; 180/12; 280/304.1

(58) Field of Search ........................... 180/11, 6.5, 65.5, 180/65.2, 65.8, 907, 14.2, 15, 16, 12; 280/250.1, 304.1, DIG. 10, 205, 65.5; 414/541; 483/46

(56) References Cited

U.S. PATENT DOCUMENTS 2,495,573 A * 1/1950 Duke .......................... 180/11
3,713,502 A * 1/1973 Delaney et al. ............. 180/205
4,403,391 A * 9/1983 Peacock ...................... 483/46
5,121,806 A * 6/1992 Johnson ..................... 180/65.5
5,234,066 A * 8/1993 Ahsing et al. ................ 180/11
5,291,959 A * 3/1994 Malblanc ...................... 180/11
5,351,774 A * 10/1994 Okamoto ...................... 180/11
5,632,593 A * 5/1997 Aoki ........................... 414/541
5,988,304 A * 11/1999 Behrendts ..................... 180/11
6,003,625 A * 12/1999 Neuling ........................ 180/11
6,135,222 A * 10/2000 Purukawa .................. 180/65.5
6,202,773 B1 * 3/2001 Richey, II et al. ........... 180/6.5
6,329,771 B1 * 12/2001 Choi et al. ................. 180/65.5

FOREIGN PATENT DOCUMENTS

JP 11178859 7/1999

* cited by examiner

*Primary Examiner*—Brian L. Johnson
*Assistant Examiner*—Hau Phan
(74) *Attorney, Agent, or Firm*—Martin A. Farber

(57) ABSTRACT

To improve convenience of a wheelchair by enabling an outside fitting type of auxiliary power device to be automatically and securely mounted on and removed from the habituated wheelchair, the auxiliary power device, which can be mounted on and removed from the wheelchair and provide power assistance to the wheelchair, comprises photoelectric sensors for detecting positions of predetermined frames of the wheelchair, arms, each having a handle of a shape capable of being engaged with the frames attached to an outer end thereof, and driving motors for displacing the arms. When the frames are determined to be at predetermined positions based on information from the photoelectric sensors, the arms are displaced by the driving motors so as to have the handles engage with the frames.

8 Claims, 12 Drawing Sheets

AUXILIARY POWER DEVICE OF WHEELCHAIR

BACKGROUND OF THE INVENTION

1. Field of the Invention

The present invention relates to an auxiliary power device capable of mounting on and removing from a wheelchair.

2. Description of the Related. Art

In developed countries, with rapid progress of aging of population and decreasing number of children, introduction of the public nursing-care insurance system, or the like, there has been increasing necessity or expectation for development of welfare related to supportive devices. A wheelchair, which is one of movement supportive devices, is useful for people who have difficulty in walking on account of injuries, diseases, or disabilities. However, when using a hand-operated wheelchair, labor is needed in travelling in a place where there is a slope or level difference in the way. Particularly, when a user (one on the wheelchair) is tired and tries to rest his hands, the wheelchair may start to retreat on an uphill road, while speed of the wheelchair may become excessive against the will of the user on a downhill road. On the other hand, a motorized wheelchair, which is commercialized to solve such problems, is not only expensive but also has a problem that choice of the wheelchair is limited because of a limited number of varieties available, thus selection of the one best fitted for the user cannot always be made.

Accordingly, an auxiliary power device is proposed which is capable of being mounted on and removed from a habituated hand-operated wheelchair and of providing power assistance to the hand-operated wheelchair. For example, Japanese Patent Application Laid-open No.11-178859 discloses an outside fitting type of auxiliary power device, which can be mounted on and removed from by a mechanical toggle mechanism. Specifically, at both right and left ends of the auxiliary power device, open grooves are formed which can be fitted with lower frames of a wheelchair. When the auxiliary power device is mounted on the wheelchair, the lower frames of the wheelchair are fitted into the open grooves, and then handles are operated to tighten clamps. In this way, the auxiliary power device is fixed to the lower frames of the wheelchair. Contrarily, when the auxiliary power device is removed, the handles are operated to release the clamps.

However, in the above-described outside fitting type of auxiliary power device, at each time of mounting and removing thereof, the mechanical machinery needs to be manually operated. Accordingly, when the auxiliary power device is repeatedly mounted and removed, some users may feel that such workings are inconvenient. Also, there is a problem that the mounted auxiliary power device may be off the wheelchair while travelling, when the clamps come loose.

SUMMARY OF THE INVENTION

Accordingly, it is an object of the present invention to provide improvement in convenience of an outside fitting type of auxiliary power device by making it automatically and securely mountable and removable to a habituated wheelchair.

In order to solve the above-described problems, a first aspect of the present invention provides an auxiliary power device, which can be voluntarily mounted on and removed from a wheelchair and provides adequate power assistance to the wheelchair, comprising position detecting means for detecting the positions of predetermined frames of the wheelchair, engaging means having handles at outer ends thereof, each of the handles having a shape which can be engaged with the frame, driving means for displacing the engaging means, and control means for displacing the engaging means by the driving means when the frames are determined to be at the predetermined position based on information from the position detecting means to allows the handles to engage with the frames.

Here, it is preferable that the above-described position detecting means detects right and left frames of the wheelchair, and the engaging means has a first arm which can be displaced toward the left frame of the wheelchair and a second arm which can be displaced toward the right frame of the wheelchair. In this case, the control means displaces each of the arms by the driving means when the right and left frames are determined to be at the predetermined positions, and renders the first and second arm with the handles to grasp the right and left frames.

Further, the above-described handles are pivotably attached to the arms. It is preferable that each of the handles further comprises rotational angle detecting means for detecting rotational angle of the handle with respect to the arm, and calculating means for calculating inclination of a travelling road based on the rotational angle of the handle detected by the rotational angle detecting means in a state where the handle is engaged with the frame.

Furthermore, the above-described driving means comprises an electric motor, and load detecting means for detecting a load state of the electric motor. In this case, the control means stops driving of the electric motor when the load of the electric motor becomes larger than the predetermined value after the engaging means starts to be displaced.

Moreover, it is preferable that the above-described control means allows the auxiliary power device to move when the frames are determined to be not at the predetermined position, so that the frames can be positioned at the predetermined positions.

Furthermore, it is preferable that when one of the right and left frames is determined to be at the predetermined position, the control means displaces the arm on a side engaging with the frame, and allows the auxiliary power device to move so that the other of the right and left frames can be positioned at the predetermined position.

On the other hand, a second aspect of the present invention provides an auxiliary power device of a wheelchair which provides power assistance in accordance with inclination of the travelling road comprising arms for grasping frames of the wheelchair, handles pivotably attached to both outer ends of the arms and having a shape capable of engaging with the frame of the wheelchair in order to grasp the frames, detecting means for detecting rotational angles of the handles relative to the arms, and specifying means for specifying an inclination state of a travelling road based on the rotational angles of the handles detected by the detecting means in a state where the frames are grasped by the arms with the frames.

Here, it is preferable that the above-described specifying means detects a position in which the inclination of the travelling road is determined to vary based on variation of the rotational angles of the handles.

BRIEF DESCRIPTION OF THE DRAWINGS

These and other objects and advantages of the present invention will become clear from the following description with reference to the accompanying drawings, wherein.

DETAILED DESCRIPTION OF THE PREFERRED EMBODIMENTS

Figure 1:
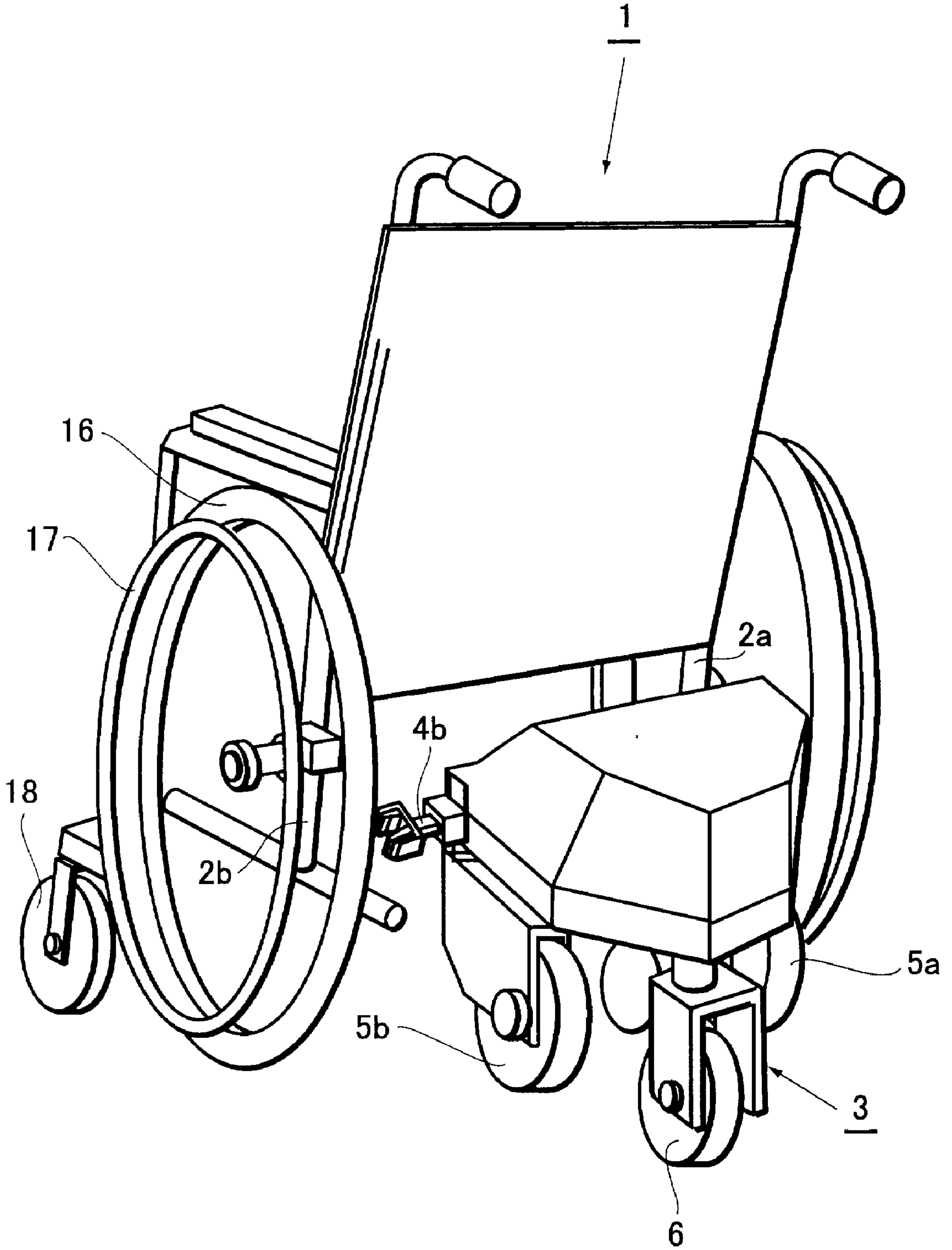
FIG. 1 is an explanatory view of mounting an auxiliary power device on a wheelchair.

FIG. 1 is an explanatory view of mounting an auxiliary power device on a wheel chair 1 according to an embodiment of the present invention. The wheelchair 1 is a general type of hand-operated wheelchair operated by rotating push rims 17 respectively mounted on both sides of large wheels 16 by a user, and the wheelchair itself does not have a power mechanism. At the lower front portion of the wheelchair 1, auxiliary front wheels 18 are attached on the both sides. In addition, at the lower rear portion of the wheelchair, an outside fitting type of auxiliary power device which provides power assistant to the wheelchair 1 is removably mounted. The auxiliary power device 3 comprises driving wheels 5*a*, 5*b*, which rotate and drive independently with each other, a driven wheel 6, and a mounting/removing mechanism including a pair of arms 4*a*, 4*b* which extend in the lateral direction (wheelchair-width direction). The arms 4*a*, 4*b* have a shape of a square rod. An extension width of the arms 4*a*, 4*b* can be arbitrarily controlled, and therefore it can also be mounted on a wheelchair 1 having a different width, and adapted to almost all varieties of general type hand-operated wheelchairs.

Figure 2:
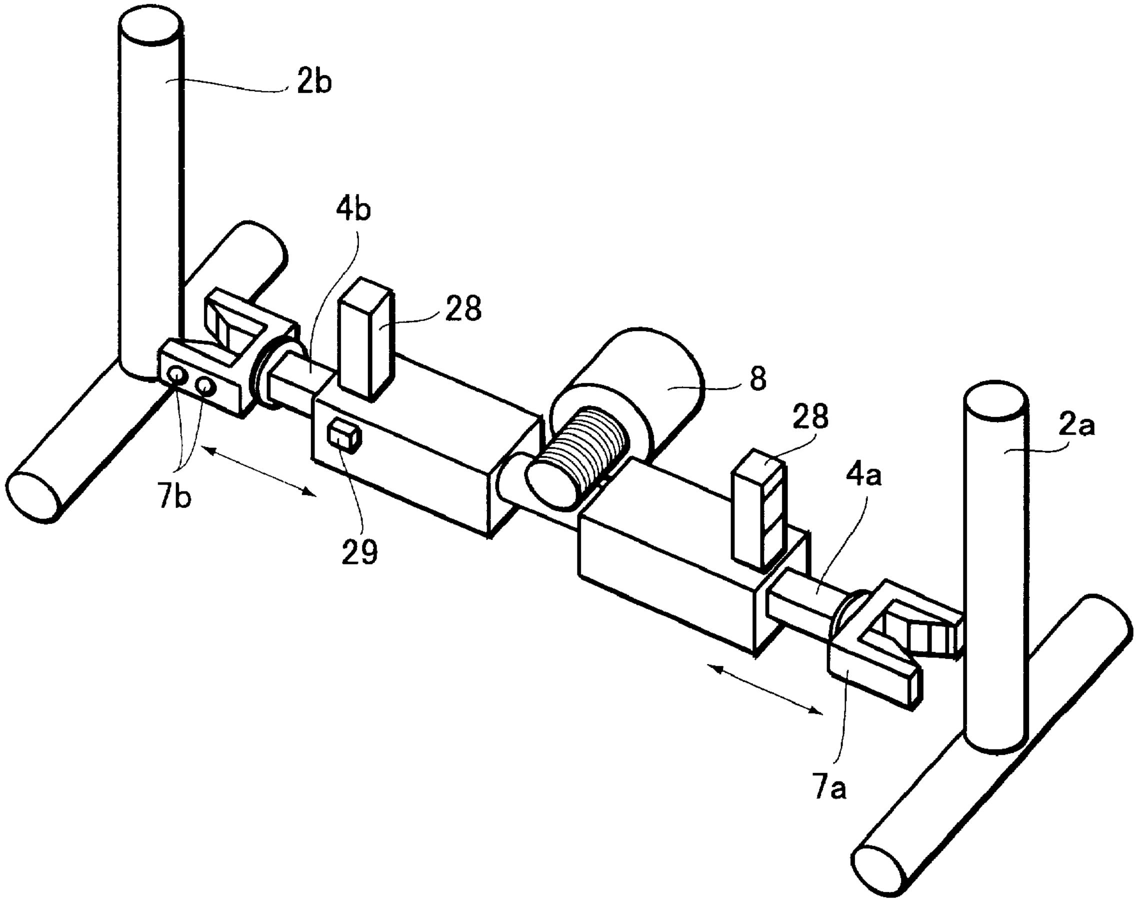
FIG. 2 is an explanatory view of a grasping state of a frame.

As illustrated in FIG. 2, the arms 4*a*, 4*b* are extended outward in a state where the arms 4*a*, 4*b* are extendibly arranged between the frames 2*a*, 2*b* which are disposed in the longitudinal direction (wheelchair-height direction) at both sides of the wheelchair 1. The frames 2*a*, 2*b* are grasped by the arms 4*a*, 4*b* with handles 7*a*, 7*b*, thereby the auxiliary power device 3 is fixed to the wheelchair 1. Specifically, the arms 4*a*, 4*b* are mounted on the auxiliary power device 3 in a state where they can be extended in the lateral direction (wheelchair-width direction), and are shifted outward or inward by a. driving motor 8. In addition, the handles 7*a*, 7*b* are mounted at right and left outer ends of the arms 4*a*, 4*b*, having a shape which permits an engagement with cylindrical frames 2*a*, 2*b* (pipe). When the driving motor 8 is turned forward in a state where the right and left handles 7*a*, 7*b* are not engaged with the frames 2*a*, 2*b* (release state), the right arm 4*a* shifts in the right direction while the left arm 4*b* shifts in the left direction, by a mechanism as described hereinafter. Next, when handles 7*a*, 7*b* are engaged with the frames 2*a*, 2*b*, the driving motor 8 stops. By a grasping force of the handles 7*a*, 7*b* in this state, the auxiliary power device 3 is fixed to the wheelchair 1. On the other hand, when the auxiliary power device 3 is removed, the driving motor 8 is turned reversely, so that the handles 7*a*, 7*b* are inwardly shifted.

Figure 3:
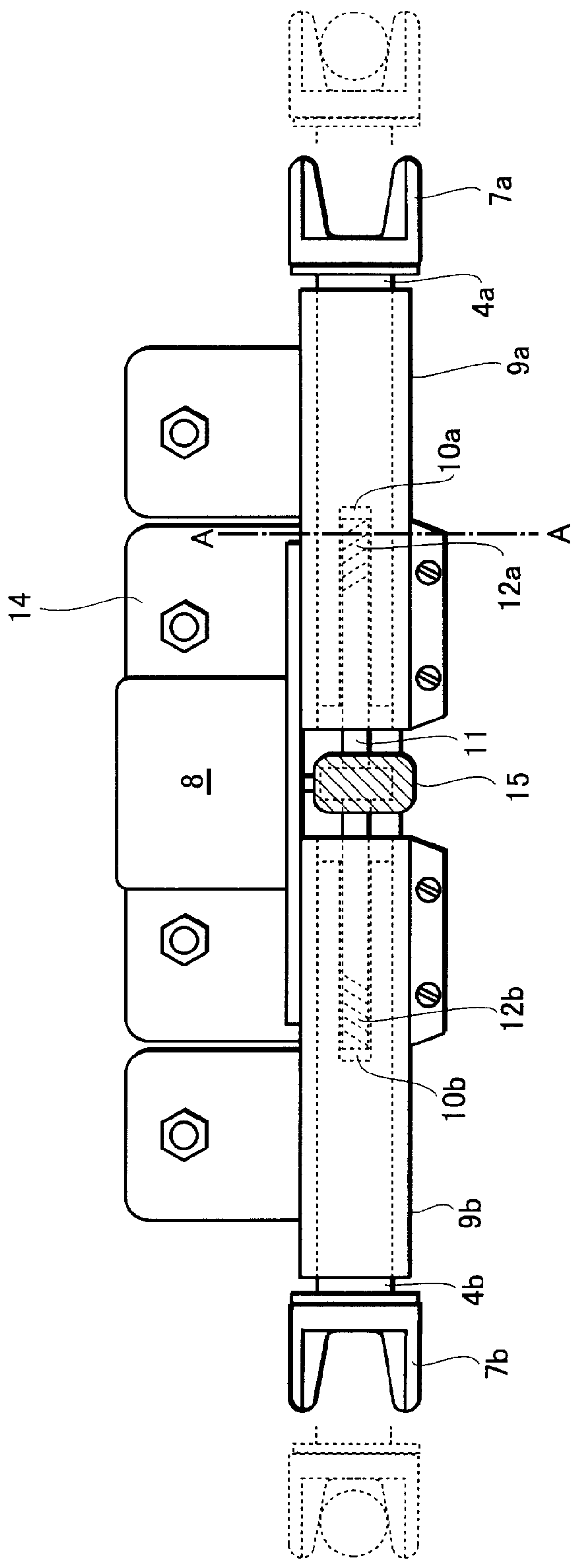
FIG. 3 is a top plan view of a mounting/removing mechanism.
Figure 4:
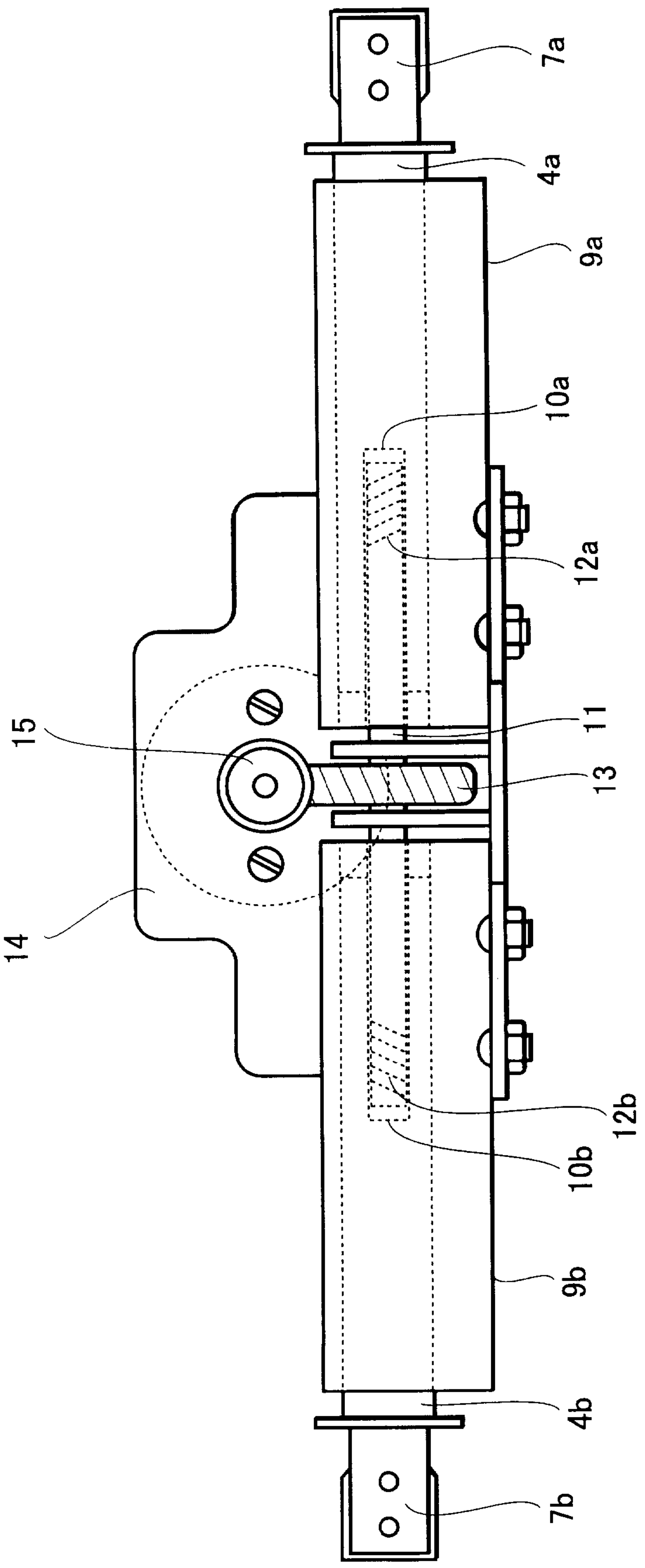
FIG. 4 is a front elevation view of the mounting/removing mechanism.
Figure 5:
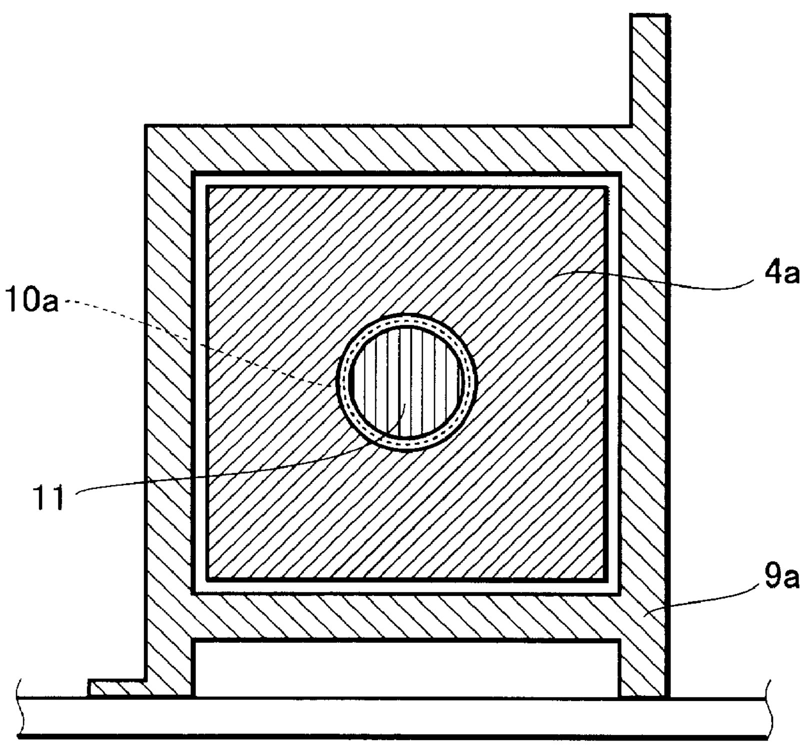
FIG. 5 is a sectional view of the mounting/removing mechanism taken along A—A line in FIG. 3.

FIG. 3 is a top view of the mounting/removing mechanism, and FIG. 4 is a front view thereof. FIG. 5 is a sectional view of the mounting/removing mechanism taken along A—A line of the view shown in FIG. 3. The arms 4*a*, 4*b* have rectangular sections as shown in FIG. 5. At the outside ends of the respective arms 4*a*, 4*b*, the above-described handles 7*a*, 7*b* are mounted. The handles 7*a*, 7*b* have parts which abut to and grasp the frames 2*a*, 2*b*. The parts are formed of such a material (for example, duracon resin) that does not hurt the frames 2*a*, 2*b*. In addition, at the inner ends of respective arms 4*a*, 4*b*, screw holes 10*a*, 10*b* are formed along the central axes thereof. These arms 4*a*, 4*b* are respectively stored in spaces formed in the interior of arm holders 9*a*, 9*b* in a state where they are arranged on the same axis line (see FIG. 5). Accordingly, the arms 4*a*, 4*b* are held in such a way that a displacement thereof is possible only in the axis direction thereof (wheelchair-width direction) by the arm holders 9*a*, 9*b* fixed to the main body of the auxiliary power device 3.

Figure 6:
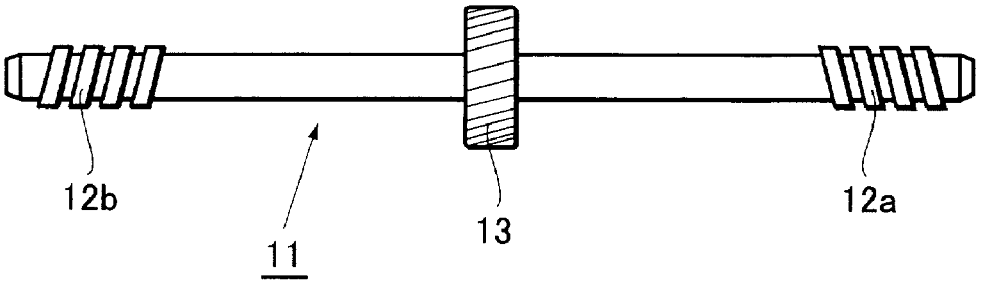
FIG. 6 is an explanatory view of a driving rod.

The arms 4*a*, 4*b* are linked with a rotary rod 11 via feed-screw mechanisms. FIG. 6 is an explanatory view of the rotary rod 11. At the both ends of the rotary rod 11, formed are outside screws, namely screws 12*a*, 12*b*, which can engage with the screw holes 10*a*, 10*b*. The screws 12*a*, 12*b* are formed in a reverse direction with each other. In addition, at the center of the rotary rod 11, a wheel 13 is provided. The rotary rod 11 is mounted in a state where it can revolve, namely in a state where the screws 12*a*, 12*b* are screwed with the screw holes 10*a*, 10*b* on the sides of the arms.

In addition, the driving motor 8 is fixed to the auxiliary power device 3 by a motor holder 14, and a worm 15 is mounted on a rotational axis thereof. The worm 15 is engaged with the wheel 13 on the side of rotary rod 11, and a worm gear mechanism is structured by both of the members.

In the mounting/removing mechanism having such structure, when the driving motor 8 is driven, the rotary rod 11 revolves via the worm gear mechanism (13, 15). The revolving operation of the rotary rod 11 is converted into the sliding operation in the axis direction of the right and left arms 4*a*, 4*b* via the feed-screw mechanisms 10*a*, 12*a* (10*b*, 12*b*). At the occasion, since the right and left screws 12*a*, 12*b* are in the relationship of reverse screw with each other, the handles 7*a*, 7*b* slide outward (in the direction to grasp the frames 2*a*, 2*b*) when the driving motor 8 turns forward, and slide inward when it turns reverse. In this way, the arms 4*a*, 4*b* can be extended or retracted by turning the driving motor 8 forward or reverse.

Figure 13:
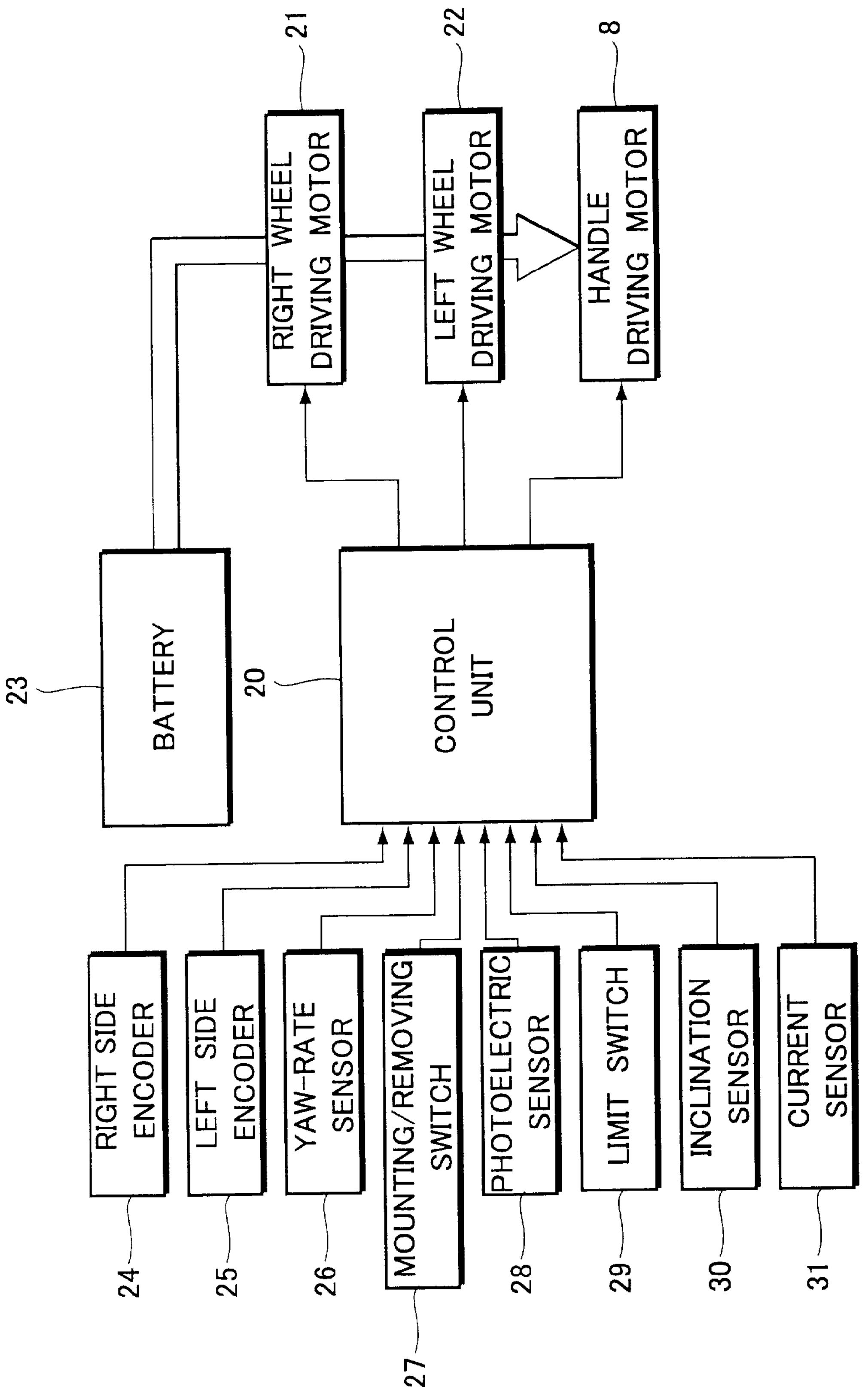
FIG. 13 is a block diagram of a control system of the auxiliary power device.

FIG. 13 is a block diagram of a control system of the auxiliary power device 3. A control unit 20 controls the driving motors 8, 21, 22, based on information inputted from sensors and switches 24 to 31. Power for actuators such as the driving motors 8, 21, 22 or the like is supplied by a battery 23 mounted on the auxiliary power device 3.

Power assistance for the wheelchair 1 does not need the specific switching operation by the user, and is automatically performed based on the information outputted from the sensors 24 to 26. Here, a right side encoder 24 is mounted on the side of the right driving wheel 5*a* of the auxiliary power device 3, and is a sensor to detect a rotational state of the right driving wheel 5*a* A left side encoder 25 is mounted on the side of the left driving wheel 5*b*, and is a sensor to detect a rotational state of the left driving wheel 5*b*. In addition, a yaw-rate sensor 26 is provided in the vicinity of the driven wheel 6, and is a sensor to detect a yaw-rate in accordance with steering of the wheelchair 1. On the other hand, the right wheel driving motor 21 is an electric motor to drive the right driving wheel 5*a*, and the left wheel driving motor 22 is an electric motor to drive the left driving wheel 5*b*. The control unit 20 estimates a travelling state (wheel speed, change in speed, steering angle, or the like) of the wheelchair 1 based on the encoders 24, 25, and the yaw-rate sensor 26. The control unit 20 also controls the driving motors 21, 22 so as to generate driving force in accordance with the estimated current travelling state. In this way, once the auxiliary power device 3 is mounted, it provides proper power assistance.

In addition, control of the above-described mounting/removing mechanism is performed based on information outputted from the sensors 27 to 31. Here, a mounting/removing switch 27 is a switch, for switching by the operator itself, provided on an operating panel (not shown) of the auxiliary power device 3. The operator turns on the mounting/removing switch 27 when mounting the auxiliary power device 3, and turns it off when removing it. A pair of photoelectric sensors 28 are mounted, as illustrated in FIG. 2, respectively on the right and left sides of the mounting/removing mechanism so as to face toward outside of the arms 4*a*, 4*b* with respect to the direction of the axis. As the photoelectric sensors 28, for example, infrared sensors may be used, and the photoelectric sensors 28 are sensors to detect positions of the frames 2*a*, 2*b* of the wheelchair 1, more particularly whether the frames 2*a*, 2*b* are positioned on the axis line of the arms 4*a* 4*b*. In addition, a limit switch 29 is attached on the mounting/removing mechanism (see FIG. 2). The limit switch is turned on when the arms 4*a* 4*b* reach an innermost position, namely when the arms 4*a*, 4*b* are retracted to the maximum. Furthermore, a current sensor 31 is a sensor to detect a current flowing through the driving motor 8 for monitoring a load state of the motor 8. When action for preventing the arms 4*a*, 4*b* from further moving outwardly is exerted on the arms 4*a*, 4*b*, and a load on the driving motor 8 becomes gradually larger, a higher current flows through the driving motor 8. Accordingly, by monitoring the current detected by the current sensor 31, it can be determined whether the frames 2*a*, 2*b* are properly grasped by the arms 4*a*, 4*b* with the handles 7*a*, 7*b*. An inclination sensor 30 is described later.

The auxiliary power device 3 is mounted in the following process. At first, the operator switches the mounting/removing switch 27 from off to on. According to the switching operation, the arms 4*a*, 4*b*, which have been retracted, enter a stand-by state in which they can slide outward. In the stand-by state, when the both frames 2*a*, 2*b* detected by the photoelectric sensor 28 are positioned on the axis line of the arms 4*a*, 4*b*, the control unit 20 determines that the auxiliary power device 3 may be mounted. In this case, the control unit 20 turns forward the driving motor 8 to have a pair of arms 4*a*, 4*b* start sliding outward and then monitor a current value detected by the current sensor 31. As described above, when the arms 4*a*, 4*b* with handles 7*a*, 7*b* grasp the frames 2*a*, 2*b*, a load of the driving motor 8 becomes larger, thus the detected current value becomes larger. Then, the current flowing through the driving motor 8 is derived in advance at the time when a force for properly fixing the auxiliary power device 3 onto the wheelchair 3 (namely, grasping power of the arms 4*a*, 4*b* with the handles 7*a*, 7*b*) is secured, and the current value is set as a threshold value. When the current value detected by the current sensor 31 reaches the threshold value thus set in advance, the control unit 20 determines that the arms 4*a*, 4*b* with handles 7*a*, 7*b* have grasped the frames 2*a*, 2*b* to stop revolution of the driving motor 8, thereby the auxiliary power device 3 is fixed onto the wheelchair 1 with a proper fixing force.

It should be noted that when the wheelchair 1 or the auxiliary power device is moved while the arms 4*a*, 4*b* are in the midst of sliding outward, sliding movement of the arms 4*a*, 4*b* is suspended since it is in a positional relationship in which the auxiliary power device 3 cannot be mounted. In this case, the arms 4*a*, 4*b* are displaced toward the retracting side to be reset into the stand-by state.

Supposing that both frames 2*a*, 2*b* are positioned on the axis line of the arms 4*a*, 4*b*, but the wheelchair 1 is offset either the left or right side with respect to the auxiliary power device 3, the auxiliary power device 3 can be properly mounted even in that case. For example, when the auxiliary power device 3 is offset to the right side, the right handle 7*a* grasps the right frame 2*a* before the left handle 7*b* doing so. Since, in this case, the right handle 7*a* abuts with the right frame 2*a*, the wheelchair 1 itself is moved toward the right side, thus the offset of the wheelchair 1 is eliminated. Thereafter, the left handle 7*b* grasps the left frame 2*b*, thus the auxiliary power device 3 is properly fixed onto the wheelchair 1.

Furthermore, in the stand-by state, when the frames 2*a*, 2*b* detected by the right and left photoelectric sensors 28 are not positioned on the axis line of the arms 4*a*, 4*b*, the control unit 20 determines that the auxiliary power device 3 cannot be mounted. Consequently, the control unit 20 does not slide the arms 4*a*, 4*b*. In this case, the operator moves the wheelchair 1 or the auxiliary power device 3 to adjust relative positions of the both. By this adjustment, if the frames 2*a*, 2*b* are positioned on the axis line of the arms 4*a*, 4*b*, the control unit 20 renders the arms 4*a*, 4*b* to slide. Thus, it becomes possible to properly fix the auxiliary power device 3 onto the wheelchair 1 without causing an error of fixing.

On the other hand, when the auxiliary power device 3 is removed, the user switches the mounting/removing switch 27 from on to off. By this, the driving motor 8 turns reverse to have the extended arms 4*a*, 4*b* to slide in the retracting direction, thus the auxiliary power device 3 is detached from the wheelchair 1. Then, when the arms 4*a*, 4*b* are detected to be in a state where they are retracted to the maximum, by a signal from the limit switch 29, the control unit 20 stops sliding movement of the arms 4*a*, 4*b*.

In this way, the auxiliary power device 3 according to the present embodiment can be automatically and easily mounted on or removed from a habituated wheelchair, without separately providing an interface or adapter for mounting each of the various types of the wheelchair, or without reconstructing the wheelchair 1. Consequently, convenience with respect to the mounting and removing of the auxiliary power device 3 on and from the wheelchair 1 can be improved.

In addition, the auxiliary power device 3 can be universally mounted on such a wheelchair 1 as one having different interval between the right and left frames 2*a*, 2*b*. Since the wheelchair 1 is normally manufactured in a specification paying consideration to the body shape or the preference of the user, there are variations in the wheelchair-width (interval between the right and left frames 2*a*, 2*b*) of the wheelchair 1. Accordingly, sliding quantities of the arms 4*a*, 4*b* necessary for grasping the right and left frames 2*a*, 2*b* with the handles 7*a*, 7*b* differ for each wheelchair 1. Thereupon, the arms 4*a*, 4*b* are slid outward while monitoring the load state of the driving motor 8, and sliding of the arms 4*a*, 4*b* is stopped when the predetermined high load state is reached. Consequently, the auxiliary power device 3 can be properly mounted onto each of the wheelchairs 1 having various different wheelchair-width, thus improvement in flexibility of the auxiliary power device 3 can be achieved.

In addition, by means of the grasping force of the arms 4*a*, 4*b* with the handles 7*a*, 7*b*, the auxiliary power device 3 can be securely fixed onto the wheelchair 1. Therefore, in comparison with the prior arts, an accident such as the auxiliary power device is unwillingly removed from the wheelchair 1 while the wheelchair 1 is travelling can be effectively prevented. Moreover, the mounting/removing control according to the present invention is not limited to the above-mentioned embodiments, but can include the following embodiments.

(1) The driving motor 8 is provided for each of the right and left arms 4*a*, 4*b*, enabling the both arms 4*a*, 4*b* to independently slide. Thus, even when only one of the frames 4*a*, 4*b* is positioned on the axis line of the arms 4*a*, 4*b*, the auxiliary power device 3 can be mounted. For example, suppose a case that the travelling direction of the auxiliary power device 3 is directed toward the left with respect to the travelling direction of the wheelchair 1, and only the right frame 2*a* is positioned on the above-described axis line. In this case, the right arm 4*a* is first moved to slide, and the right arm 4*a* is engaged with the right frame 2*a*. Then, while maintaining the engaged state on the right side, the auxiliary power device 3 is manually advanced (or may be also traveled by itself). Thus, only the right side of the wheelchair 1 is pushed by the auxiliary power device 3, and the wheelchair 1 moves in the rotational direction while deviating. When the left frame 2*b* is positioned on the axis line of the left arm 4*b* through such movement of the wheelchair 1, sliding operation of the left arm 4*b* is started. By this operation, the right and left arms 4*a*, 4*b* can grasp the both frames 2*a*, 2*b* with the handles 7*a*, 7*b*.

(2) As the right and left photoelectric sensors 28, CCD cameras may be used. The frames 2*a*, 2*b* are detected within imaging areas of the right and left CCD cameras, however, when positions of frames 2*a*, 2*b* are not on the axis line of the arms 4*a*, 4*b*, the auxiliary power device 3 travels by itself to perform front-and-back movement or rotational movement. Then, when both frames 2*a*, 2*b* come to proper positions, the auxiliary power device 3 stops and the right and left arms 4*a*, 4*b* perform the sliding movement. By the sliding movement, the right and left arms 4*a*, 4*b* can grasp both frames 2*a*, 2*b* with the handles 7*a*, 7*b*.

(3) One of the arms (for example, the left arm 4*b*) may be manufactured as a fixed type which does not slide. In this case, the operator first engages the handle 7*b* of the fixed arm 4*b* with the left frame 2*b*. Then, while maintaining the engaged state, relative positions between the wheelchair 1 and the auxiliary power device 3 are adjusted so that the right frame 2*a* is positioned on the axis line of the right arm 4*a*. Then, when the right photoelectric sensor 28 detects the right frame 2*a*, the right arm 4*a* slides and the right handle 7*a* is engaged with the right frame 2*a*. By this engagement, the right and left arms 4*a*, 4*b* can grasp both frames 2*a*, 2*b* with the handles 7*a*, 7*b*.

Figure 7:
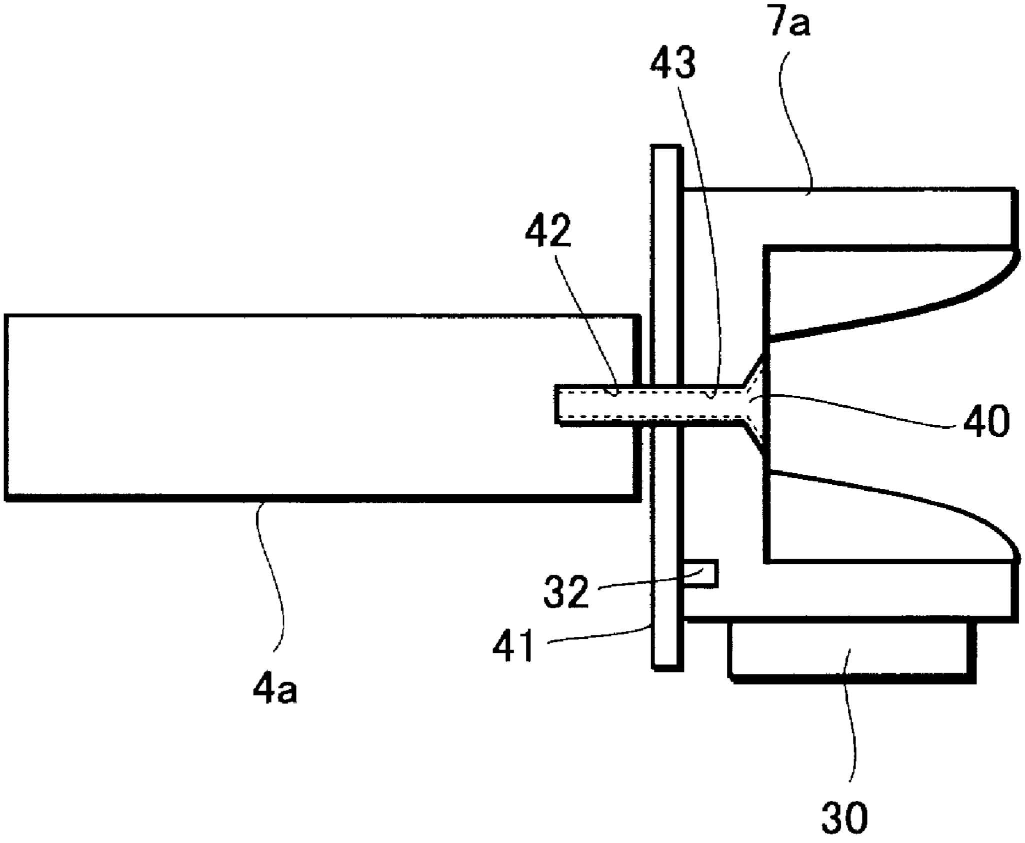
FIG. 7 is an expanded top plan view of an outer end of an arm.
Figure 8:
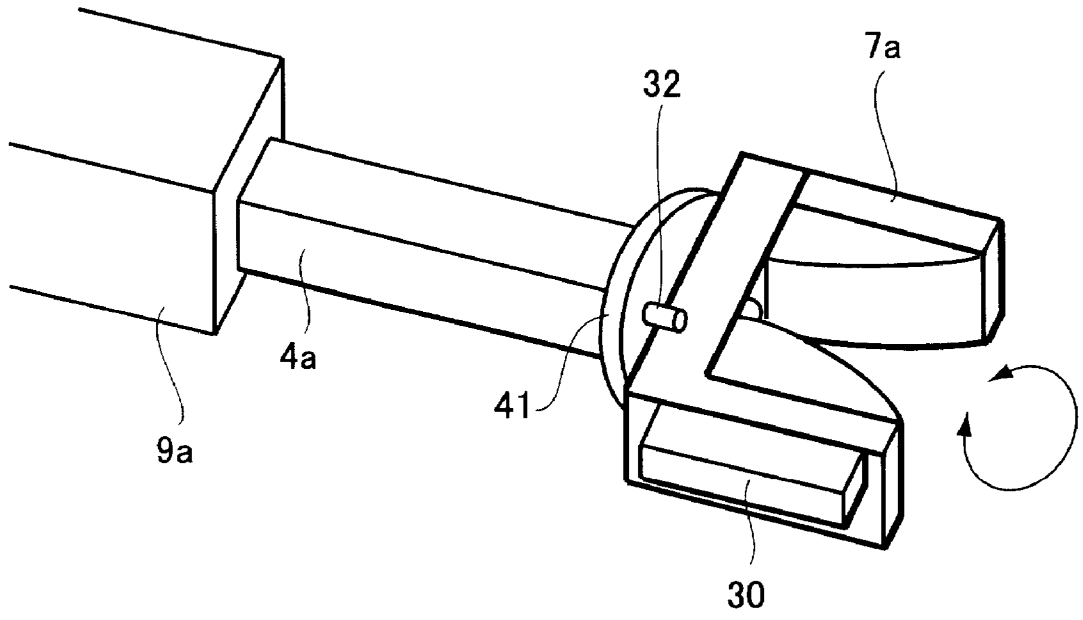
FIG. 8 is an explanatory view of a revolving state of the arm in the axis direction thereof.
Figure 9:
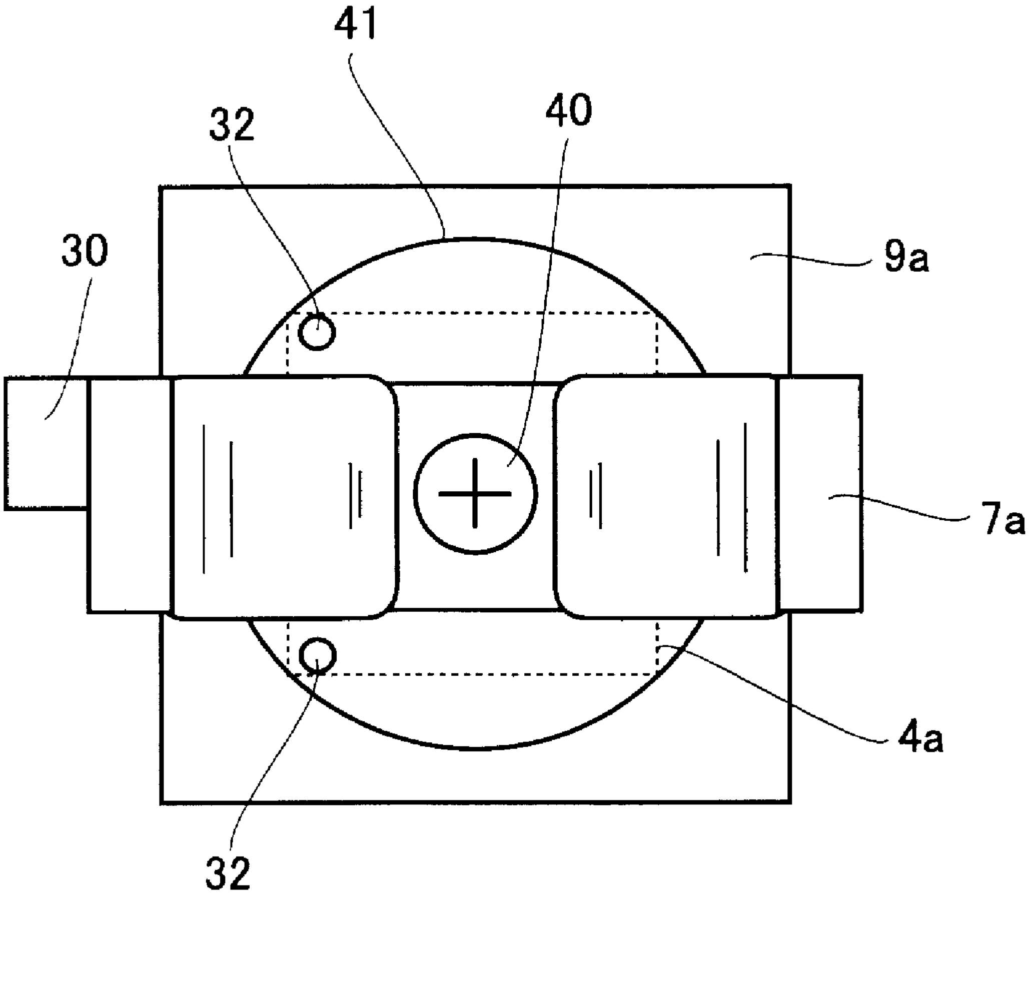
FIG. 9 is a front elevation view of an outer end of an arm.

Now, described will be a method in which the structure of the above-described mounting/removing mechanism is modified to estimate an inclination state of a travelling road. FIG. 7 is an expanded top plan view of an outer end of the right arm 4*a*, and FIG. 8 is an explanatory view of a revolving state of the arm 4*a* around the axis. Also, FIG. 9 is a front elevation view of a front end of the right arm 4*a*. The left arm 4*b* also may be structured in the same way. At the outer end of the arm 4*a*, the handle 7*a* is attached in a state capable of revolving about the axis of the arm 4*a* by means of a screw 40. In more detail, a central portion of the front end of the arm 4*a* has a mounting hole 42 with a bottom having a screw portion to be screwed by the screw 40, which is formed along the axis of the arm 4*a*. Further, formed in the central portion of the handle 7*a* is a mounting hole 43 which has such a shape that the screw 40 with a plate-like head can be stored without being projected. Note that the mounting hole 43 is not provided with a screw portion. When the handle 7*a* is mounted, the screw 40 is inserted into the mounting hole 43 of the handle 7*a*, a washer 41, and the mounting hole 42 in sequence. Then, the screw 40 is screwed down until it reaches the bottom of the mounting hole 42. The screw 40 has a length a little longer than a total of a depth of the both mounting holes 42, 43 and a thickness of the washer 41, so that a clearance can be formed between the handle 7*a* and the outer end of the arm 4*a* when the both members are mounted with each other. Thus, the handle 7*a* can be rotated against the arm 4*a*.

Moreover, a rotational range of the handle 7*a* is limited by a pair of projecting stoppers 32 mounted on the washer 41, so that the handle 7*a* can be easily mounted on or removed from the frame 2*a*. Also, as the inclination sensor 30 mounted on the handle 7*a* may be used a conventional absolute inclination sensor which comprises IC(integrated circuit) chip and detects an absolute inclination angle based on a direction of gravity.

Figure 12A:
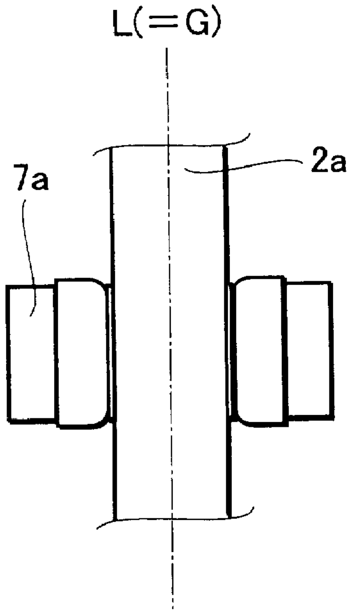
FIGS. 12A and 12B are explanatory views respectively showing relationship between a frame of a wheelchair and a revolution of a handle.
Figure 12B:
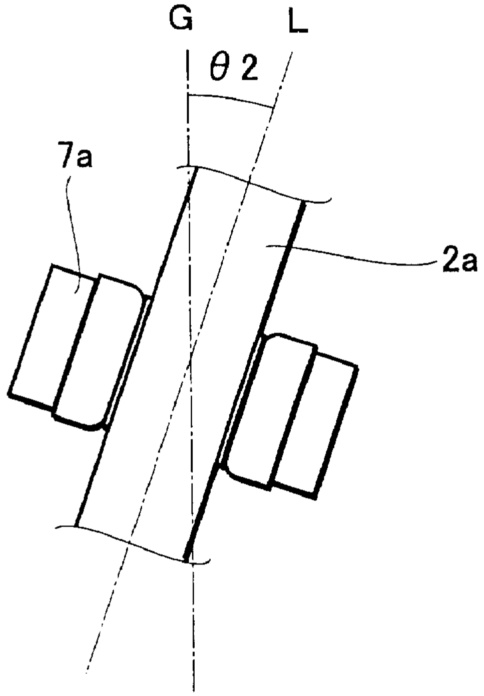

Furthermore, the inclination sensor 30 may be a rotary encoder or the like to detect the rotational angle of the handle 7*a* relative to the arm 4*a*. In this case, based on the rotational angle of the handle 7*a* detected by the inclination sensor 30, the inclination state of the travelling road can be calculated. When the wheel chair 1 is placed on a flat road surface, the frame 2*a* of the wheelchair 1 is perpendicular relative to the road surface, as shown in FIG. 12A. In this state, the rotational angle of the handle 7*a* grasping the frame 2*a* is made θ1 (0° in this embodiment). When the wheelchair 1 travels and comes to a rising inclination such as a slope, level difference, undulation, or the like, a pitching is caused to the wheelchair 1. In this state, the auxiliary front wheels 18 of the wheelchair 1 is positioned on the inclined road, but the auxiliary power device 3 has not yet come to the inclined road. Accordingly, for example, as shown in FIG. 12B, the handle 7*a* grasping the frame 2*a* revolves in a clockwise direction associated with the inclination of the frame 2, thus the rotational angle of the handle 7*a* temporarily becomes θ2 ($\theta 1<\theta 2$). This enables the control unit 20 to determine that the current position of the wheelchair 1 is at a position where the inclination of the travelling road varies (for example, at the beginning of a road having the rising inclination) when the rotational angle of the handle 7*a* varies at more than the predetermined value,.

As shown in FIG. 13, the control unit 20 monitors sensor information from the inclination sensor 30. When it determines that the inclination of the travelling road is varied at the current position, the driving force of the right and left driving motors 21, 22 is controlled to increase or decrease. By this control, the power assistance with a natural feeling can be provided without making the user have a feeling of discomfort. Moreover, since the pitching of the wheelchair 1 is detected directly from the frame 2a of the wheelchair 1, it is possible to provide pitching detection superior in accuracy and responsibility.

Figure 10:
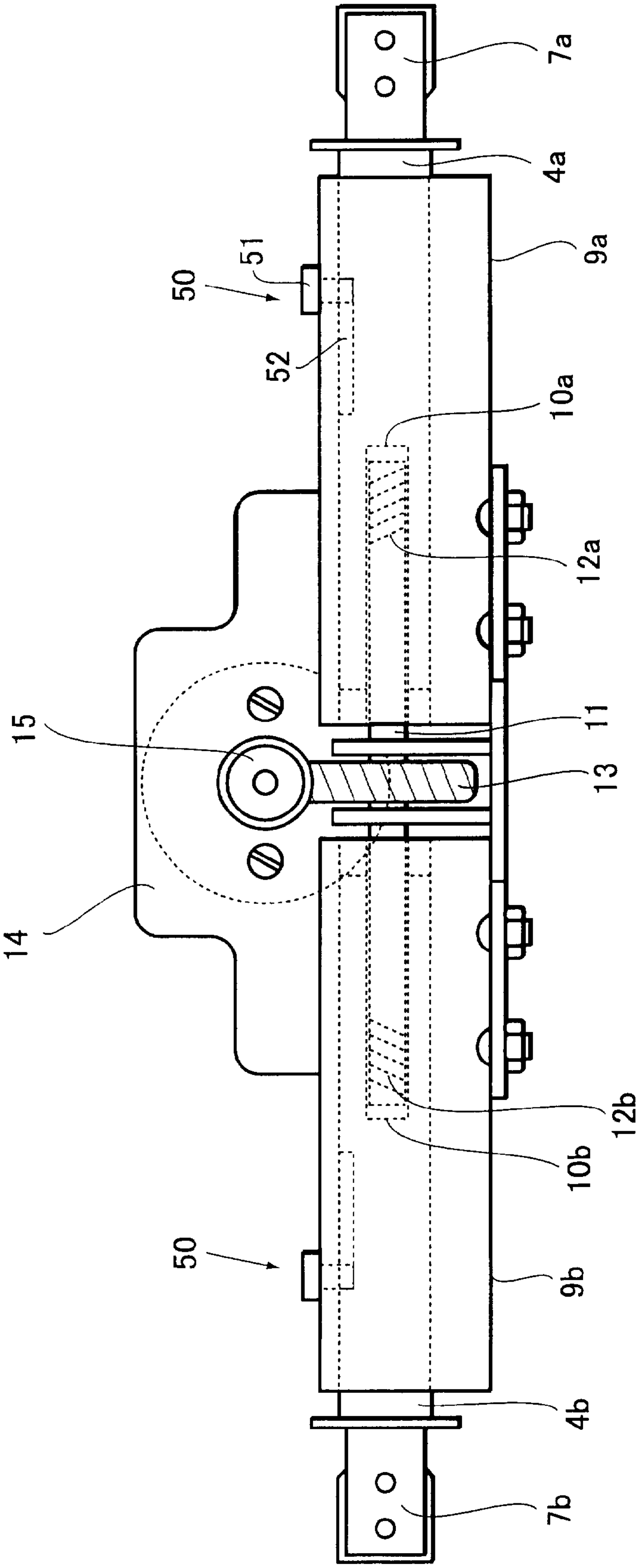
FIG. 10 is a front elevation view of the mounting/removing mechanism concerned with a modified embodiment.
Figure 11:
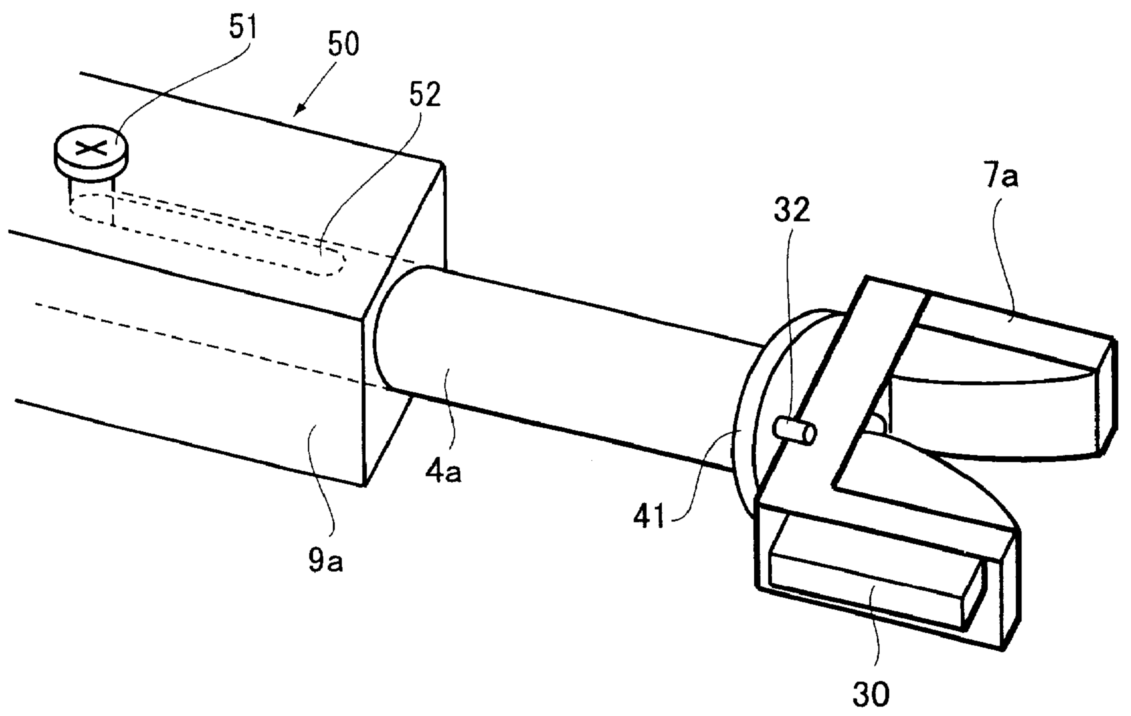
FIG. 11 is an explanatory view of the outer end of the arm concerned with the modified embodiment of FIG. 10.

Moreover, in the above embodiments, the arm 4a, 4b has a shape of a square rod, a section of which is rectangular. However, it is possible to provide the same mounting/removing mechanism as mentioned above even if columnar arms 4a, 4b having a section of circle are used as a modified embodiment. The reasons will be described hereinafter with the following drawings. FIG. 10 is a front elevation view of the detachable mechanism concerned with the modified embodiment, and FIG. 11 is a schematic view of the outer end of the arm thereof. Moreover, the same members as mentioned above are given the same reference numeral, each explanation of which is omitted.

In the case that the columnar arms 4a, 4b are used, it is necessary to prevent the arms themselves from rotating with effect of the above-mentioned feed-screw mechanism. Then, the modified embodiment provides each of the arms 4a, 4b with guide portions 50, as shown in FIG. 10, as rotation limiting means. The function of the guide portions 50 will be explained using the right arm 4a. A guide groove 52 is formed extending along an axial direction thereof at a top end of the arm 4a. A guide pin 51 is inserted into a screwed hole formed in the arm holder 9a. The guide pin 51 is screwed until a tip end thereof is engaged with the guide groove 52. As a result, the rotation of the arm 4a and also an expansion and contraction range thereof in the axial direction is regulated. The latter is relied upon the length of the guide groove 52 in the axial direction. Moreover, in this construction also, a detachable operation between the handle 7a,7b and the frame 2a,2b can be surely carried out since the rotational range of the handle 7a is limited by a pair of projecting stoppers.

In this way, according to the present invention, an outside fitting type of auxiliary power device can be automatically and securely mounted on and removed from a habituated wheelchair, so that the convenience for the user can be improved.

While the invention has been described in conjunction with preferred specific embodiment thereof, it will be understood that this description is intended to illustrate and not to limit the scope of the invention, which is defined by the following claims.

What is claimed is:

1. An auxiliary power device, which can be voluntarily mounted on and removed from a wheelchair and provides power assistance to the wheelchair, comprising:

position detecting means for detecting a position of a predetermined frame of said wheelchair;

engaging means having handles at outer ends thereof, said handle having a shape being capable of engaging with said frame;

driving means for displacing said engaging means toward said frame; and control means for controlling said driving means to displace said engaging means toward said frame when said frame is determined to be at the predetermined position based on information from said position detecting means so as to allow said handles to engage with said frame.

2. The auxiliary power device of a wheelchair according to claim 1, wherein:

said position detecting means detects right and left frames of said wheelchair;

said engaging means has a first arm displacable toward the left frame side of said wheelchair, and a second arm displacable toward the right frame side of said wheelchair; and said control means displaces each of said arms by controlling said driving means when said right and left frames are determined to be at predetermined positions, and grasps said right and left frames by said first and second arm with said handles.

3. The auxiliary power device of a wheelchair according to claim 2, wherein:

each of said handles is pivotably attached to said arm; and said auxiliary power device of said wheelchair further comprises:

rotational angle detecting means for detecting at least one of rotational angles of said handles relative to said arms, and calculating means for calculating inclination of a travelling road of said wheelchair based on at least one of the rotational angles of said handles detected by said rotational angle detecting means in a state where said handles are engaged with said frames.

4. The auxiliary power device of a wheelchair according to claim 2, wherein:

said control means displaces said arm engaging with one of the right and left frames when it is determined to be at the predetermined position, and allows said auxiliary power device to move so that the other of said right and left frames can be positioned at the predetermined position.

5. The auxiliary power device of a wheelchair according to claim 1, wherein:

said driving means comprises an electric motor and load detecting means for detecting a load state of said electric motor; and said control means stops driving of said electric motor when a load of said electric motor becomes larger than a predetermined value after said engaging means starts to be displaced.

6. The auxiliary power device of a wheelchair according to claim 1, wherein:

said control means allows said auxiliary power device to move so that said frame can be positioned at the predetermined position, when said frame is determined to be not at the predetermined position.

7. An auxiliary power device of a wheelchair which provides power assistance in accordance with inclination of a travelling road, comprising:

arms for grasping frames of said wheelchair;

handles pivotably attached to both outer ends of said arms, and having a shape engaged with said frames of said wheelchair in order to grasp the frames, detecting means for detecting rotational angles of said handles relative to said arms, and specifying means for specifying an inclination state of a travelling road based on said,rotational angles of said handles detected by said detecting means in a state where said frames are grasped by said arms with the handles.

8. The auxiliary power device of a wheelchair according to claim 7, wherein:

said specifying means detects a position where inclination of the travelling road is determined to vary based on variation of the rotational angles of said handles.

* * * * *